US011775739B2

(12) United States Patent
Yang et al.

(10) Patent No.: US 11,775,739 B2
(45) Date of Patent: Oct. 3, 2023

(54) VISUAL TAGGING AND HEAT-MAPPING OF EMOTION

(71) Applicant: SONY INTERACTIVE ENTERTAINMENT LLC, San Mateo, CA (US)

(72) Inventors: Rui Yang, San Mateo, CA (US); Courtney Yingling, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/510,877

(22) Filed: Oct. 26, 2021

(65) Prior Publication Data
US 2023/0125367 A1  Apr. 27, 2023

(51) Int. Cl.
G06F 40/00 (2020.01)
G06F 40/169 (2020.01)
G10L 25/63 (2013.01)
G06F 40/20 (2020.01)

(52) U.S. Cl.
CPC ........... *G06F 40/169* (2020.01); *G06F 40/20* (2020.01); *G10L 25/63* (2013.01)

(58) Field of Classification Search
CPC ......... G06F 40/169; G06F 40/20; G10L 25/63
See application file for complete search history.

(56) References Cited

U.S. PATENT DOCUMENTS 10,293,260 B1 *   5/2019   Evans ............... A63F 13/424
2003/0033145 A1   2/2003   Petrushin
2004/0249634 A1  12/2004   Degani et al.
(Continued)

FOREIGN PATENT DOCUMENTS

WO   WO 2023/055446       4/2023
WO       2023075945 A1    5/2023

OTHER PUBLICATIONS

U.S. Appl. No. 17/491,269, Victoria Dorn, Emotion Detection & Moderation Based on Voice Inputs, filed Sep. 30, 2022.
(Continued)

*Primary Examiner* — Scott T Baderman
*Assistant Examiner* — Barbara M Level
(74) *Attorney, Agent, or Firm* — Polsinelli LLP

(57) ABSTRACT

Systems and methods for visually tagging communications in communication sessions are provided. A current communication session associated with a user device communicating with one or more other user devices may be monitored. The current communication session may include a plurality of messages including a set of the messages associated with the user device. An emotional state may be identified for each of the messages in the set and categorized based on analyzing the set of the messages in view of contextual information regarding the user of the user device. A categorized emotional state of at least one of the messages may be detected as triggering a tagging rule associated with the user of the user device. A presentation of the set of the messages may be modified within the current communication session based on the tagging rule. The modified presentation may include one or more tags indicative of the categorized emotional state of the at least one message.

20 Claims, 6 Drawing Sheets

(56) References Cited

U.S. PATENT DOCUMENTS

| | | | |
|---|---|---|---|
| 2006/0025214 A1* | 2/2006 | Smith | A63F 13/52 |
| | | | 463/30 |
| 2006/0079260 A1 | 4/2006 | Tillet et al. | |
| 2006/0270918 A1 | 11/2006 | Stupp et al. | |
| 2011/0083086 A1* | 4/2011 | Brownlow | A63F 13/79 |
| | | | 715/753 |
| 2014/0223462 A1* | 8/2014 | Aimone | G16H 40/67 |
| | | | 725/10 |
| 2014/0244264 A1* | 8/2014 | Thirumalainambi | G10L 25/63 |
| | | | 704/270 |
| 2014/0270109 A1 | 9/2014 | Raihi et al. | |
| 2017/0148343 A1 | 5/2017 | Merzenich et al. | |
| 2018/0109482 A1* | 4/2018 | DeLuca | G06N 20/00 |
| 2019/0052471 A1* | 2/2019 | Panattoni | H04L 67/306 |
| 2019/0126152 A1* | 5/2019 | Taylor | H04L 51/10 |
| 2019/0325201 A1* | 10/2019 | Gujral | G06F 3/04886 |
| 2020/0061477 A1* | 2/2020 | Mahlmeister | A63F 13/352 |
| 2020/0089767 A1 | 3/2020 | Ni et al. | |
| 2020/0134298 A1* | 4/2020 | Zavesky | H04N 7/157 |
| 2020/0153772 A1* | 5/2020 | Bostick | H04L 51/10 |
| 2020/0164278 A1* | 5/2020 | Andre | G06Q 10/10 |
| 2020/0175972 A1* | 6/2020 | Fan | G06F 40/279 |
| 2020/0197810 A1* | 6/2020 | Kung | G10L 15/26 |
| 2020/0298131 A1* | 9/2020 | Pinto | A63F 13/79 |
| 2021/0031106 A1* | 2/2021 | Aiderman | A63F 13/5372 |
| 2021/0076002 A1* | 3/2021 | Peters | H04N 7/152 |
| 2021/0174805 A1* | 6/2021 | Wang | G10L 25/63 |
| 2021/0185276 A1 | 6/2021 | Peters et al. | |
| 2021/0272584 A1* | 9/2021 | Mcalpine | A63F 13/215 |
| 2023/0096357 A1 | 3/2023 | Dorn et al. | |

OTHER PUBLICATIONS

PCT/US22/34274, Emotion Detection & Moderation Based on Voice Inputs, Jun. 21, 2022.

PCT/US22/43571, Visual Tagging and Heat-Mapping of Emotion, Sep. 15, 2022.

PCT Application No. PCT/US2022/034274 International Search Report and Written Opinion dated Sep. 28, 2022.

PCT Application No. PCT/US2022/043571 International Search Report and Written Opinion dated Jan. 6, 2023.

U.S. Appl. No. 17/491,269 Non-Final Office Action dated Nov. 22, 2022.

U.S. Appl. No. 17/491,269 Final Office Action dated May 3, 2023 (41 pages).

* cited by examiner

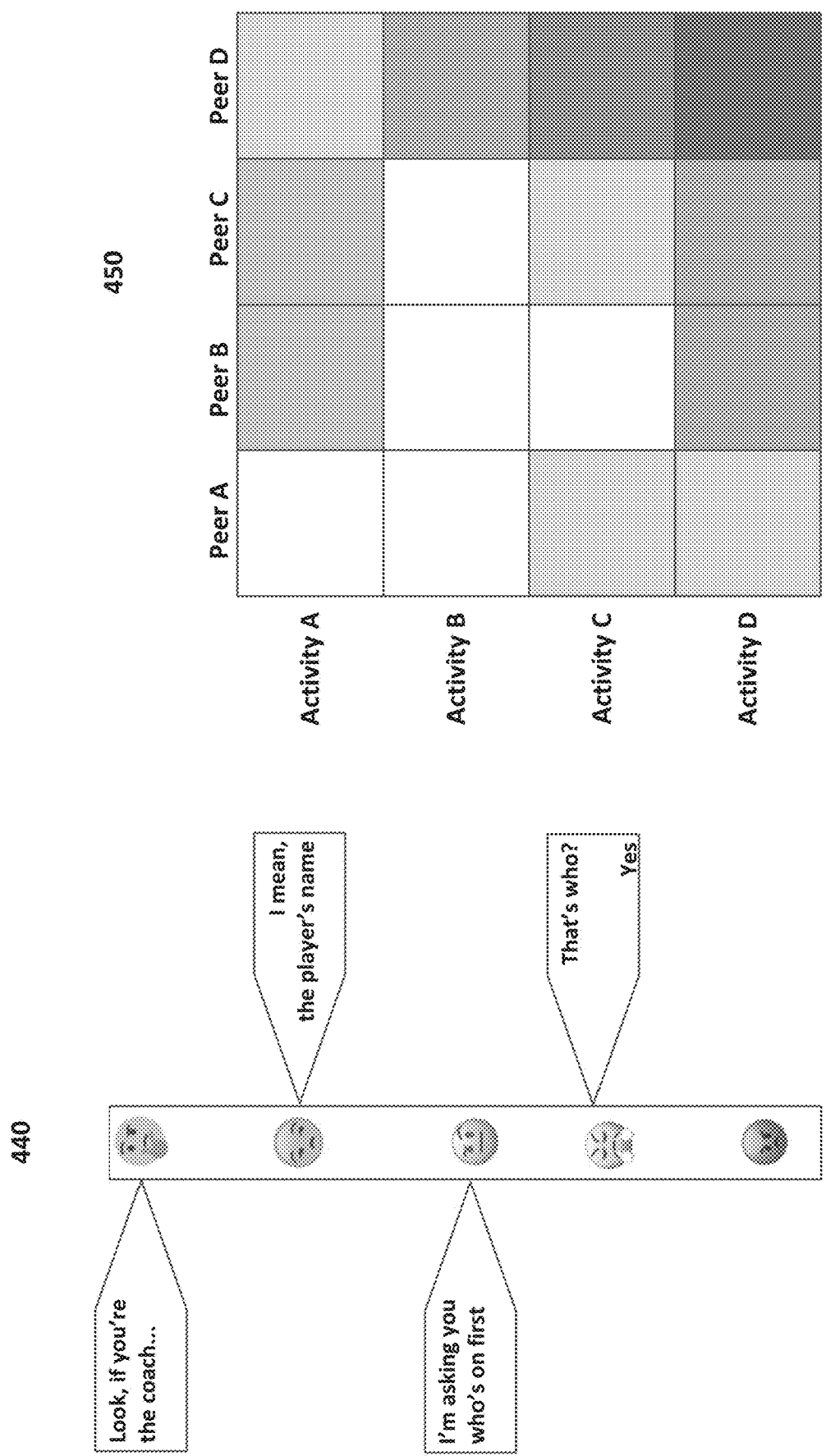

VISUAL TAGGING AND HEAT-MAPPING OF EMOTION

BACKGROUND OF THE INVENTION

1. Field of the Invention

The present invention generally relates to visually mapping emotion. More specifically, the present invention relates to visually tagging and heat-mapping of emotion.

2. Description of the Related Art

Presently available digital content titles may elicit different types of emotional responses in different users that interact with various digital elements in associated digital environments of such titles. Further, engagement with some digital content titles may involve interaction with other users within the digital (e.g., virtual) environment or within associated communication sessions. Such other users may exhibit their own emotions, and thus, the interaction with the other users may itself elicit or otherwise affect the types and extents of emotional states of users.

To some extent, users may be unaware of the types of emotions that they feel or exhibit within an interactive (e.g., gameplay) session and within associated communication session(s). For example, some users may feel frustrated when a current gameplay session is not going well. In other situations, users may become stressed when other users are yelling or otherwise exhibiting anger. In such cases or in similar cases, the user's mental health or sensory processing conditions may deteriorate or otherwise suffer when exposed to others' negative emotions over extended periods of time. Another example may include players who may not wish to expose themselves to profanity, graphic content, bullying language, misgendering language, or other aggressive, hostile, or violent language (e.g., harassment, threats). In particular, young players (e.g., children) may have parents, guardians, or other supervisors (e.g., relatives, child-care professionals) who wish to limit their charge's exposure to such negative emotions and associated language.

In certain situations, the users may also be unaware of the types of emotions that others feel or are exhibiting. Such lack of awareness may be further exacerbated where the user is unable to view or interpret others' facial expressions or other traditional indicators of emotion. During gameplay sessions, for example, many players use avatars to interact with others while avoiding exposure of their real-world appearance (including facial expressions and physical gestures). Moreover, tone of voice may not necessarily translate into simple text during chat-based communication sessions. Thus, emotional cues may be missed within such contexts.

There is, therefore, a need in the art for improved systems and methods of visually tagging and heat-mapping of emotion.

SUMMARY OF THE CLAIMED INVENTION

Embodiments of the present invention include systems and methods for visually tagging and heat-mapping of emotion. A current communication session associated with a user device communicating with one or more other user devices may be monitored. The current communication session may include a plurality of messages including a set of the messages associated with the user device. An emotional state may be identified for each of the messages in the set and categorized based on analyzing the set of the messages in view of contextual information regarding the user of the user device. A categorized emotional state of at least one of the messages may be detected as triggering a tagging rule associated with the user of the user device. A presentation of the set of the messages may be modified within the current communication session based on the tagging rule. The modified presentation may include one or more tags indicative of the categorized emotional state of the at least one message.

BRIEF DESCRIPTION OF THE DRAWINGS

FIG. 4C illustrates an exemplary heat map of emotion associated with a player of interactive content titles.

FIG. 4D illustrates an exemplary heat map of emotion associated with multiple players across multiple interactive activities.

DETAILED DESCRIPTION

Embodiments of the present invention include systems and methods for visually tagging and heat-mapping of emotion. A current communication session associated with a user device communicating with one or more other user devices may be monitored. The current communication session may include a plurality of messages including a set of the messages associated with the user device. An emotional state may be identified for each of the messages in the set and categorized based on analyzing the set of the messages in view of contextual information regarding the user of the user device. A categorized emotional state of at least one of the messages may be detected as triggering a tagging rule associated with the user of the user device. A presentation of the set of the messages may be modified within the current communication session based on the tagging rule. The modified presentation may include one or more tags indicative of the categorized emotional state of the at least one message.

Figure 1:
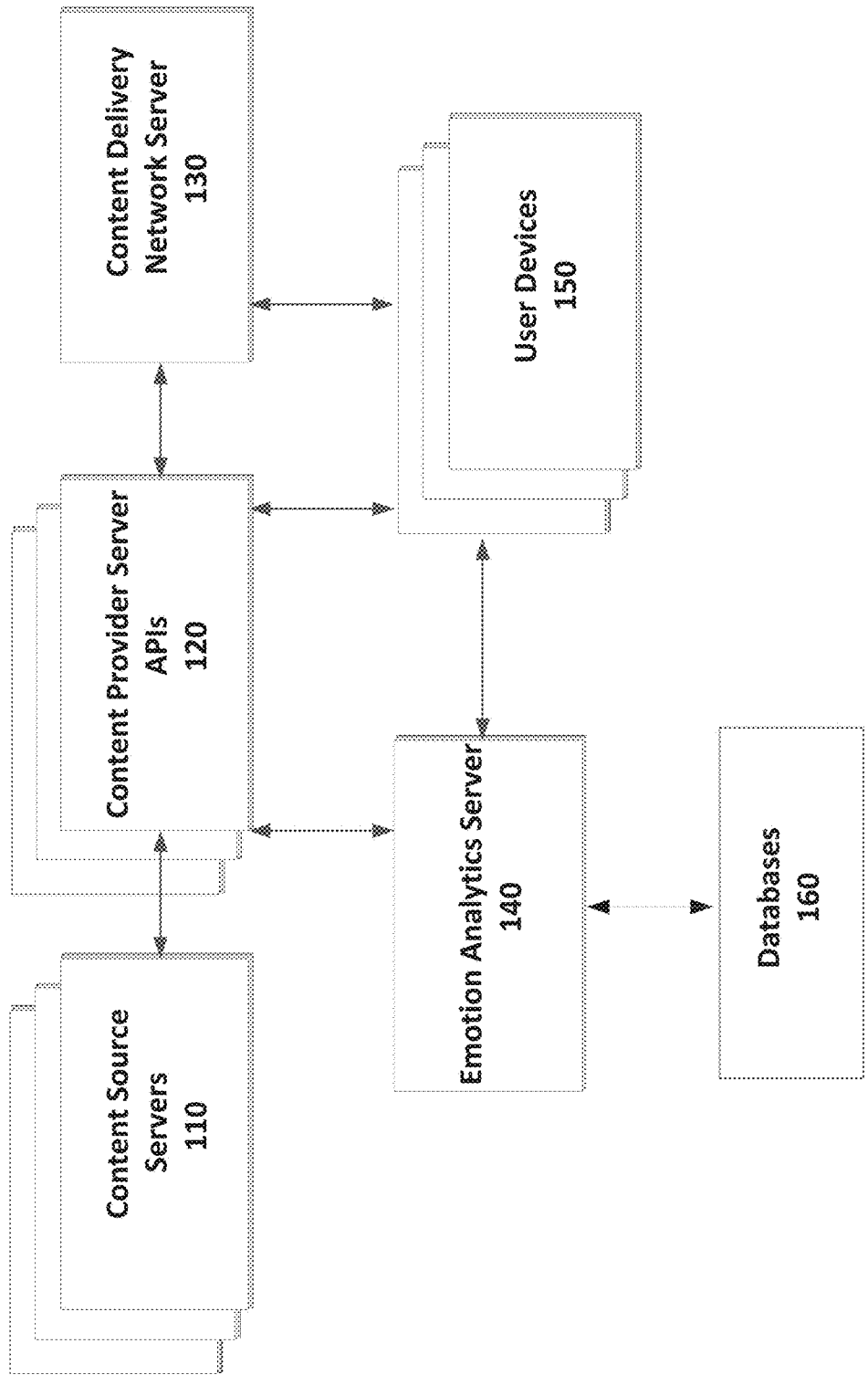
FIG. 1 illustrates a network environment in which a system for visually tagging and heat-mapping of emotion may be implemented.

FIG. 1 illustrates a network environment in which a system for visually tagging and heat-mapping of emotion may be implemented. The network environment 100 may include one or more content source servers 110 that provide digital content (e.g., games, other applications and services) for distribution, one or more content provider server application program interfaces (APIs) 120, content delivery network server 130, an emotion analytics server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different content titles, which may further have be associated with object data regarding a digital or virtual object (e.g., activity information, zone information, character information, player information, other game media information, etc.) displayed in a digital or virtual environment during an interactive session.

Such content may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent with one or more communication sessions, and the gameplay and communication sessions may be hosted on one or more of the content source servers 110.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, emotion analytics server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Emotion analytics server 140 may include any data server known in the art that is capable of communicating with the different content source servers 110, content provider server APIs 120, content delivery network server 130, user devices 150, and databases 160. Such emotion analytics server 140 may be implemented on one or more cloud servers that carry out instructions associated with interactive content (e.g., games, activities, video, podcasts, User Generated Content ("UGC"), publisher content, etc.). The emotion analytics servers 140 may further carry out instructions, for example, for monitoring a current communication session associated with a specified user device communicating with one or more other user devices, categorizing an emotional state associated with each of the messages associated with the specified user device based on analyzing the set of the messages in view of contextual information regarding the user of the user device, detecting that a categorized emotional state of at least one of the messages triggers a tagging rule associated with the user of the user device, and modifying a presentation of the set of the messages within the current communication session based on the tagging rule so as to include one or more tags indicative of the categorized emotional state of the at least one message.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a computing device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants (e.g., players) or other types (e.g., spectators) of users in relation to a collection of digital content streams.

While pictured separately, the databases 160 may be stored on any of the servers and devices illustrated in network environment 100 on the same server, on different servers, or on any of the user devices 150. Such databases 160 may store or link to various voice-emotion learning models, language-emotion models, facial expression-emotion models, or other emotion models, each of which may be specific to different emotions, users, or user groups. Databases 160 may also store other resources used for evaluating emotional states exhibited during communication sessions. In addition, databases 160 may store emotion profiles, as well as tagging rules that may be specific to and further customizable to a particular emotion, user, user group or team, user category, game title, game genre, language category, etc. One or more user emotion profiles and associated emotion learning models may also be stored in the databases 160 for each user. In addition to gameplay data regarding the user (e.g., user progress in an activity and/or media content title, user ID, user game characters, etc.), the user emotion profile may include emotion datasets specific to the user.

Exemplary learning models associated with emotion identification may include a variety of detectable indicators, including textual indicators (e.g., diction or word choice, profanity, keywords, terms, phrases, etc.), verbal indicators (e.g., changes in voice intonation, pitch or frequency, rate or tempo of speech, rhythms, volume, etc.), visual indicators (e.g., facial expressions, skin tone such as flushed or pale relative to calm states), physiological or behavioral indicators (e.g., biometric changes such as heart rate, signs of stress, increased errors in input, etc.), in-game indicators (e.g., errors in gameplay, character behaviors), and other indicators associated with mood, sentiment, emotion, etc., known in the art. The learning models may further be refined for different players, who may exhibit different indicators for a given emotion. A specific player may further be associated with multiple different learning models corresponding to different emotions. The learning models may further be refined based on user input from the user or from others who may provide feedback as to the emotional state of a particular user. As such, the learning models may continually be updated with different indicators or levels thereof that indicate a given emotion in a given user.

Databases 160 may further store one or more tagging rules that are correlate visual tags (e.g., emoji) with different emotional states and levels thereof. The tagging rules may specify, for example, certain emotion-based trigger conditions related to performing a tagging actions. The trigger conditions associated with a specific emotion may include one or more threshold levels of the emotion indicators that trigger the associated tagging rule. For example, certain tagging rules may specify that high levels of indicators of anger (e.g., high volume, yelling, profanity, hate speech, racist, sexist, homophobic, mis-gendering language) in messages may trigger tagging with anger-associated tags. The tagging rule may further specify combinations of different types of the indicators discussed herein, such as indicators regarding facial expressions, voice changes, and in-game conditions and behaviors.

When the tagging rules are applied to a communication session, therefore, different messages that trigger different tagging rules may be tagged in real-time or close to real-time. Because the different messages may be associated with different users, each message may be evaluated based on the emotion indicators (as defined and refined by learning models), as well as contextual information regarding the specific user who originated the message. Such contextual information may include real-time or historical data regarding the user, their physical status, their in-game status, etc. Such contextual information may be obtained from a variety of sources, including cameras, sensors, content source servers 110, UDS system 200, etc.

The tags may also be updated as the context of the conversation indicates that the initially-assigned tag is not indicative of the emotional state of the user. For example, a message that is yelled or screamed (whether vocally or by typing in all-caps) may be initially tagged as angry, but the ensuing conversation may reveal that the associated user is merely excited, surprised, hard of hearing, in a noisy real-world environment, or other context. In addition, a tag may be updated based on input or feedback from the specified user or other users in the communication session.

The tags that are assigned in accordance with tagging rules may further serve as a basis for filtering messages, search results, options, and controlling operations. For example, a user may wish to filter messages associated with undesirable emotions so as to protect their own mental and emotional well-being and avoid stress related to such emotions when interacting with other users in communication sessions. Such a user may also specify or customize communication session presentations, interactive sessions, and device controls responsive to their own emotional states. Such customizations may include decreasing game difficulty, level of aggressive gameplay, heightened thresholds for different emotional triggers, self-censorship of profanity, neutralizing or modifying one's own voice, triggering calming effects (e.g., music, visuals, fans and other temperature adjustments, etc.

Different types of tags may be used to provide visual displays within a communication session indicative of each participating user's emotional states. Such a visual display may indicate different emotions and levels (e.g., low, medium, high) of such emotions. Different emotions may be visualized in an emotional dashboard, for example, that includes different types of measurement or metric presentation. Such visual displays may be triggered based on custom alert or notification settings as to thresholds associated with indicators for a certain emotion. In addition, the emotion analytics server 140 may also track data regarding emotional indicators for multiple users over time, as well as over multiple sessions. In addition to being used to develop and refine learning models associated with emotions, such data may be used to generate and provide a variety of visual presentations of the user's emotional data.

The user may request to view the emotional dashboard (associated with their own emotional data or the emotional data of others), which may further breakdown the emotional data by game title, game session, interaction with different specific users or user groups, time periods, or any other parameter being tracked and made accessible to emotion analytics server 140 (including data tracked by UDS system 200). Exemplary presentations of emotional data are illustrated in FIGS. 4A-D discussed in further detail herein.

In some implementations, the filters may be set not only by the users themselves, but also parents, guardians, supervisors, etc., of the users who may wish their charge to avoid exposure to certain types of emotions and indicators of the same, including profanity, graphic content, bullying language, misgendering language, or other aggressive, hostile, or violent language (e.g., harassment, threats). Thus, the assigned tag may be used as a basis for filtering a specific message or collections of messages from a presentation of a communication session. For example, voice-based messages detected as being associated with an undesired emotion and tagged accordingly may also be filtered from a version of the communication session being presented to a user by way of muting, modulating, auto-tuning, or replacement by a voice generator. In some instances, a user may choose to censor themselves and filter their own messages from being presented to others. For example, the user may specify that certain audiences (e.g., players in young age ranges) be prevented from seeing, hearing, or accessing certain types of content generated by the user under certain emotional conditions as identified by assigned tags.

During the course of a communication session, each participating user may tag their own or others' messages to indicate emotion, as well as further tagging the user or other users themselves. Tagging may be based on a selection of textual language communications, transcripts of spoken language, recorded in-game behaviors (e.g., user-generated content as captured by UDS system 200), auto-generated menus of different indicators detected as being present in the current communication session, freeform descriptions, or other selection mechanisms known in the art. The tagged emotional indicators may then be added to learning models to update tagging rules and to evaluate incoming communications within the current communication session.

Figure 2:
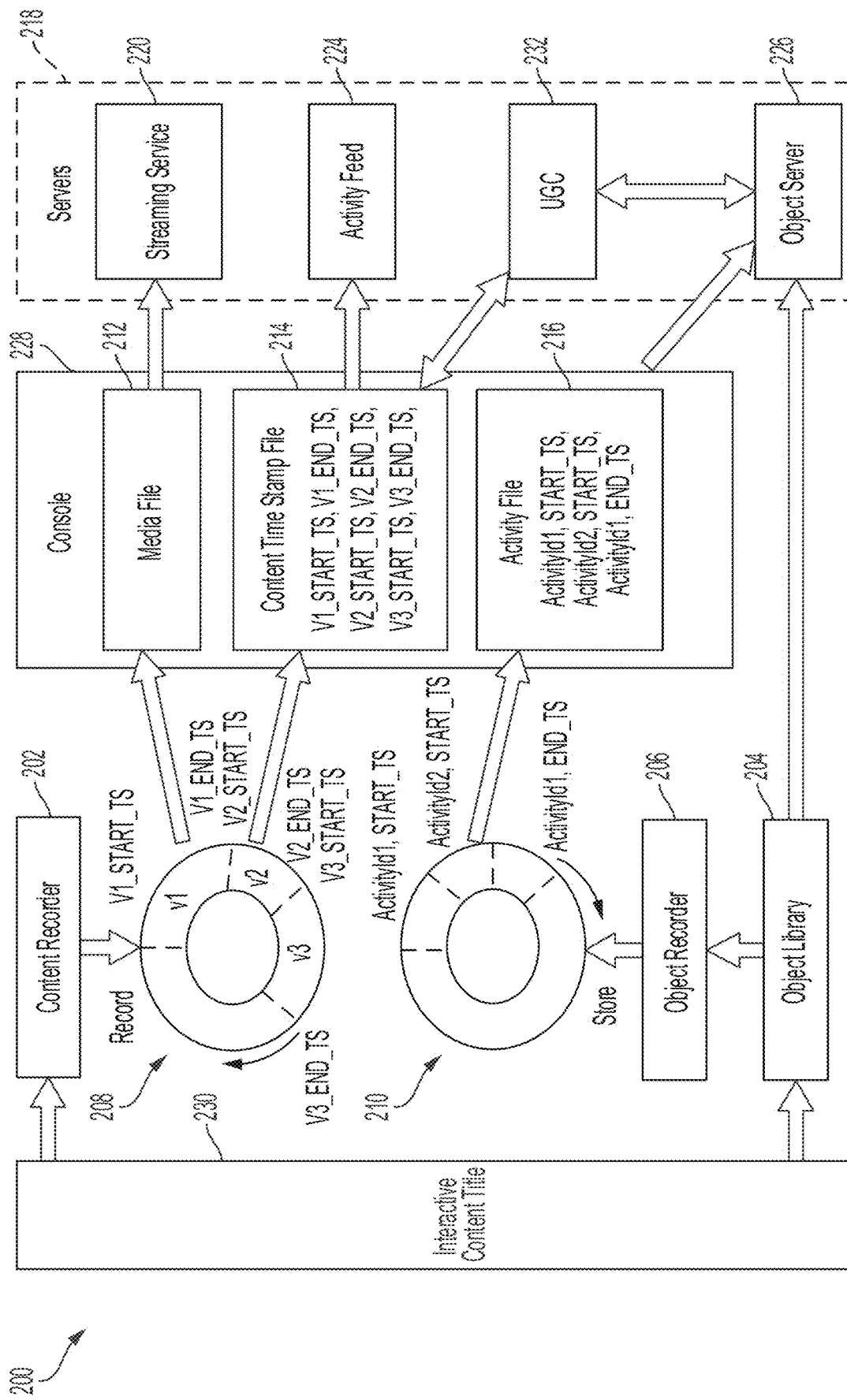
FIG. 2 illustrates an exemplary uniform data system (UDS) that may be used to provide data to a system for visually tagging and heat-mapping of emotion.

FIG. 2 illustrates an exemplary uniform data system (UDS) that may be used to provide data to a system for visually tagging and heat-mapping of emotion. Based on data provided by UDS 200, emotion analytics server 140 can be made aware of the current session conditions, e.g., what in-game objects, entities, activities, and events that users and associated character(s) have engaged with, and thus support analysis of and coordination of emotion detection and emotion-based responses by emotion analytics server 140 with current gameplay and in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC.

As illustrated in FIG. 2, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

In exemplary embodiments, the media files 212 and activity files 216 may provide information to emotion analytics server 140 regarding current session conditions. Emotion analytics server 140 may therefore use such media files 212 and activity files 216 to determine whether the context of certain messages meet any of the trigger conditions of the tagging rules associated with the monitored communication session. For example, the media files 212 and activity files 216 may include references to particular characters, locations, and objects displayed and interacted with in a current gameplay session. Based on such files 212 and 216, therefore, emotion analytics server 140 may identify in-game behaviors may be indicative of emotion rather than competitive gameplay. For example, unusual behaviors such as attacking a teammate while yelling profanities may be identified as being indicators of anger rather than a good faith effort to compete within the context of the game session. As such, evaluation of whether current in-game data provides a context that meets a trigger condition may include evaluation of certain in-game status of the user or other users. In such cases, the emotion analytics server 140 may use media files 212 and activity files 216 to evaluate and determine whether such in-game status meets or contributes to the trigger conditions.

Figure 3:
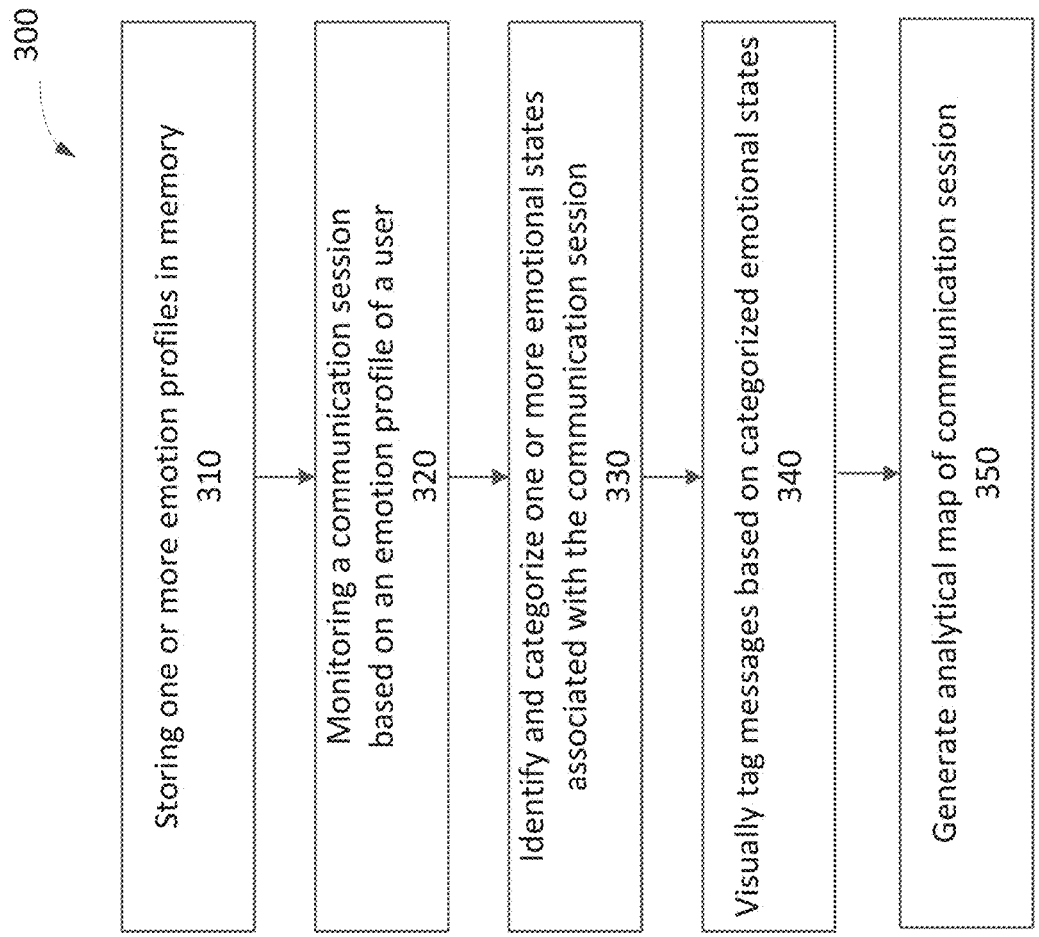
FIG. 3 is a flowchart illustrating an exemplary method for visually tagging and heat-mapping of emotion.

FIG. 3 is a flowchart illustrating an exemplary method for visually tagging and heat-mapping of emotion. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, emotion profiles may be stored in memory (e.g., databases 160) for available tags. Different tags may be associated different emotion profiles, which may further be customized to different users. Each emotion profile may be associated with one or more learning models regarding identifying an emotional state, as well as associated with one or more emotion-based tagging rules, each of which may specify one or more triggering emotional conditions associated with one or more tagging actions. The triggering emotional conditions may pertain to any emotional condition and context regarding the user, other users, the messages in a given communication session, and associated content session(s). Meanwhile, the tags may include any type of visual indicator, including any combination of emoji, color, text, icon, etc.

In step 320, a current communication session may be monitored by emotion analytics server 140 based on the emotion profiles. As each possible emotion may be associated with a specific emotion profile, emotion analytics server 140 may retrieve the associated emotion profiles from databases 160 and use the associated tagging rules to monitor a communication session in real-time (or close to real-time). Further, where the associated tagging rules may specify trigger conditions involving other or associated sessions (e.g., gameplay sessions), the emotion analytics server 140 may also obtain media files 212 and activity files 216 associated with the user who specified such trigger conditions. The media files 216 and activity files 216 may be used by emotion analytics server 140 in conjunction with the conditions of the communication session to determine whether the trigger conditions are met.

In step 330, one or more emotional states associated with different messages within the communication session may be identified and categorized. Such identification and categorization may be based on a set of indicators associated with one or more messages in the communication session may be detected as triggering a tagging rule. As noted above, the set of indicators may trigger the tagging rule when the trigger conditions specified by that tagging rule are met by the indicators. Because different users may exhibit different indicators for a given emotion, a set of indicators that triggers a tagging rule for one user may not trigger any tagging rule for another user. In a multiuser communication session where all users may be being monitored, different emotion-based learning models and trigger conditions may be used to evaluate and characterize the emotional state(s) of each user.

In step 340, messages within the communication session that trigger the conditions of the tagging rules may be tagged so as to visually indicate the corresponding emotional state of the user in real-time or close to real-time. Such tagging may include adding visual tags to a presentation of the communication session. Where the communication session includes a text-based chat stream, the tags may appear next to the associated chat message. Where the communication session may include a video-based chat stream, the tags may appear next to a transcription of the message or the user who originated the message.

In step 350, the emotion analytics server 140 may generate an analytical map regarding emotion for a given communication session or across multiple sessions. Such analytics maps may include emotional timelines, summaries of emotional journeys, heatmaps, and other graphical map displays. In some implementations, the analytical map may further include data regarding other users and their respective emotional states across the same session or multiple sessions. Any session parameter—specific game title, specific in-game activity, competitors, peers—may also be used to generate the heat map. As a result, different types of emotion heatmaps may be generated that illustrates the types and ranges of emotions exhibited by a user or group of users across one or more parameters.

Figure 4B:
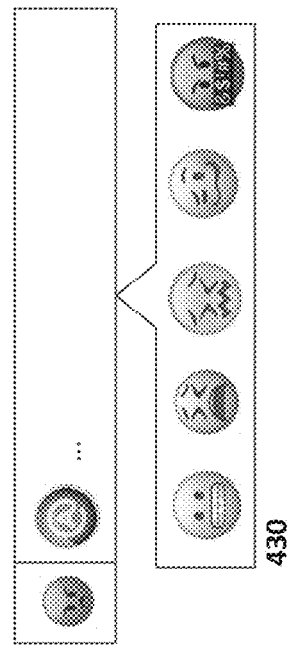
FIG. 4B illustrates an exemplary implementation of emotion-based filtration of emoji within a communication session.
Figure 4A:
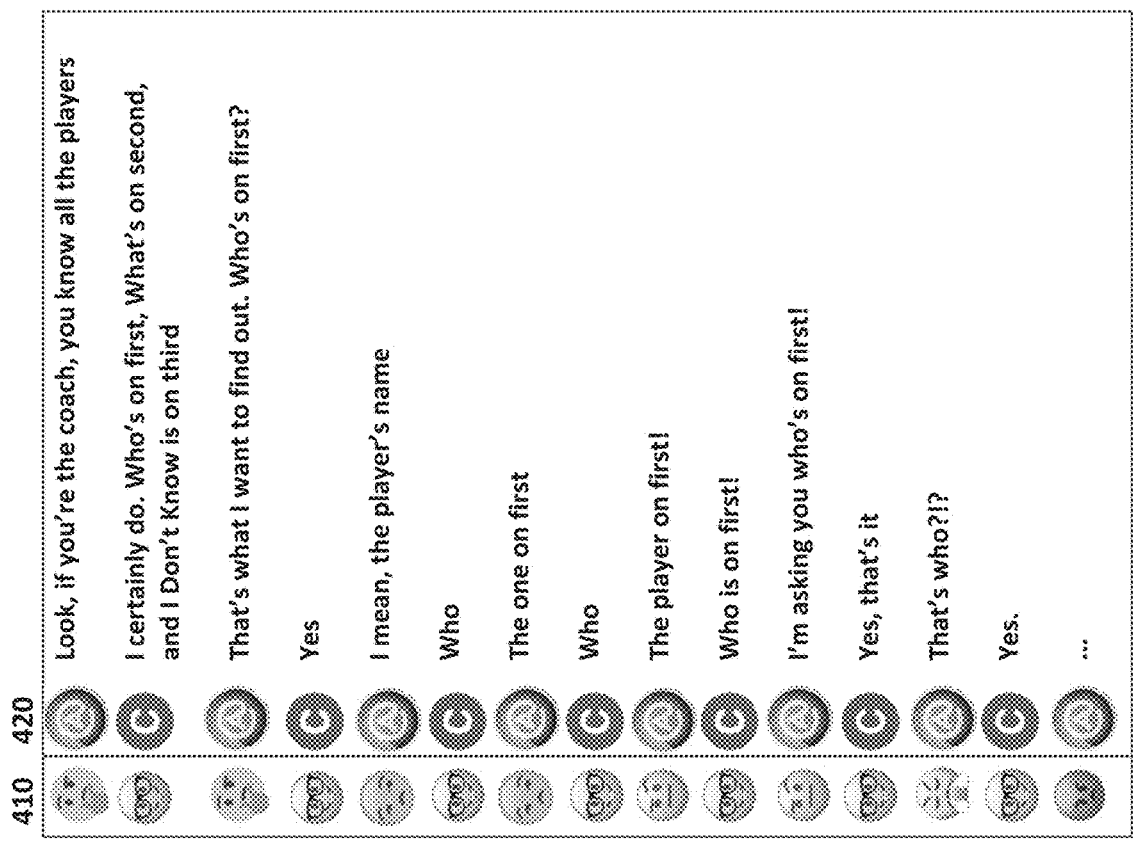
FIG. 4A illustrates an exemplary chat stream that has been visually tagged based on emotion

FIG. 4A illustrates an exemplary chat stream that has been visually tagged based on emotion. As illustrated, a collection of emotion-based tags 410 may be added to a display of a chat stream 420. The illustrated chat stream 420 includes messages from two different users, one of which is associated with the © icon and exhibits little change in emotional state. The other user associated with the @ icon, however, exhibits multiple different emotional states as the chat stream 420 progresses. The emotion-based tags 410 show that the first messages in the chat stream 420 that originating from the @ user were tagged with an emoji for thoughtful or thinking, but subsequently were tagged with emoji for annoyed, raised eyebrow, steaming breath, and flushed anger.

The addition of emotion-based tags 410 may be automatically added in real-time or close to real-time as each message is submitted to the chat stream 420. The emotion-based tags may be made visible to the user, other users, or select groups of users depending on privacy or preference settings of each user. As a result, the display may be dynamically updated to add an emotion-based tag 410 that indicates an emotional state of an originating user at the time a message was submitted. Throughout the course of the communication session, therefore, the emotional states of the participating users may be tracked and visually tagged by way of emotion-based tags. In addition to notifying the participating users as to their own emotional states and those of their peers, the emotion-based tags may further be tracked and used to perform further actions, including emotion-based filtering and mapping.

FIG. 4B illustrates an exemplary implementation of emotion-based filtration of emoji within the communication session of FIG. 4A. As illustrated, the emotion-based tag 410 associated with last message in the chat stream 420 indicates flushed anger. The originating user (e.g., the @ user) may select the last message in order to provide feedback as to the accuracy of the emotion-based tag or to enter additional message input. In such instances, a filtered menu 430 of alternative but related emotion-based tags may be generated based on the last emotion-based tag 410. Such a filtered menu 430 may also be generated for another user to provide feedback as to the perceived accuracy of the tag assignment. The originating user or another user may also select another tag believed as being more accurate or reflective of the emotional state associated with the message.

FIG. 4C illustrates an exemplary emotional journey 440 associated with the communication session of FIG. 4A. As illustrated, the emotional journey 440 illustrates changes in emotional states associated with the © user during the communication session. Because the emotional journey 440 may have been generated to illustrate the emotional states of the © user, the emotions and messages associated with the other user may not appear. Specific messages associated with the emotional changes may be included, however, to show what was happening during the communication session at the same time the emotional changes occurred.

FIG. 4D illustrates an exemplary heat map 450 of emotion associated with multiple players across multiple interactive activities. As illustrated, heat map 450 may map the intensities of different emotional states exhibited by peers A-D during gameplay in relation to activities A-D (e.g., in different game titles or different levels, locations, quests, etc., within a given game title). Such a heat map 450 may indicate comparable levels of excitement or engagement, for example, which may further provide useful information to developers, tournament organizers, match-making systems, and the users themselves as to what types of activities with which to recommend engagement. While the heat map 450 focuses on mapping by activity, different heat maps 450 may be generated for different types of session parameters. For example, heat maps 450 may be generated for emotions exhibited in relation to different peers, game titles, in-game events, in-game objects, and other identifiable conditions of the session.

Figure 5:
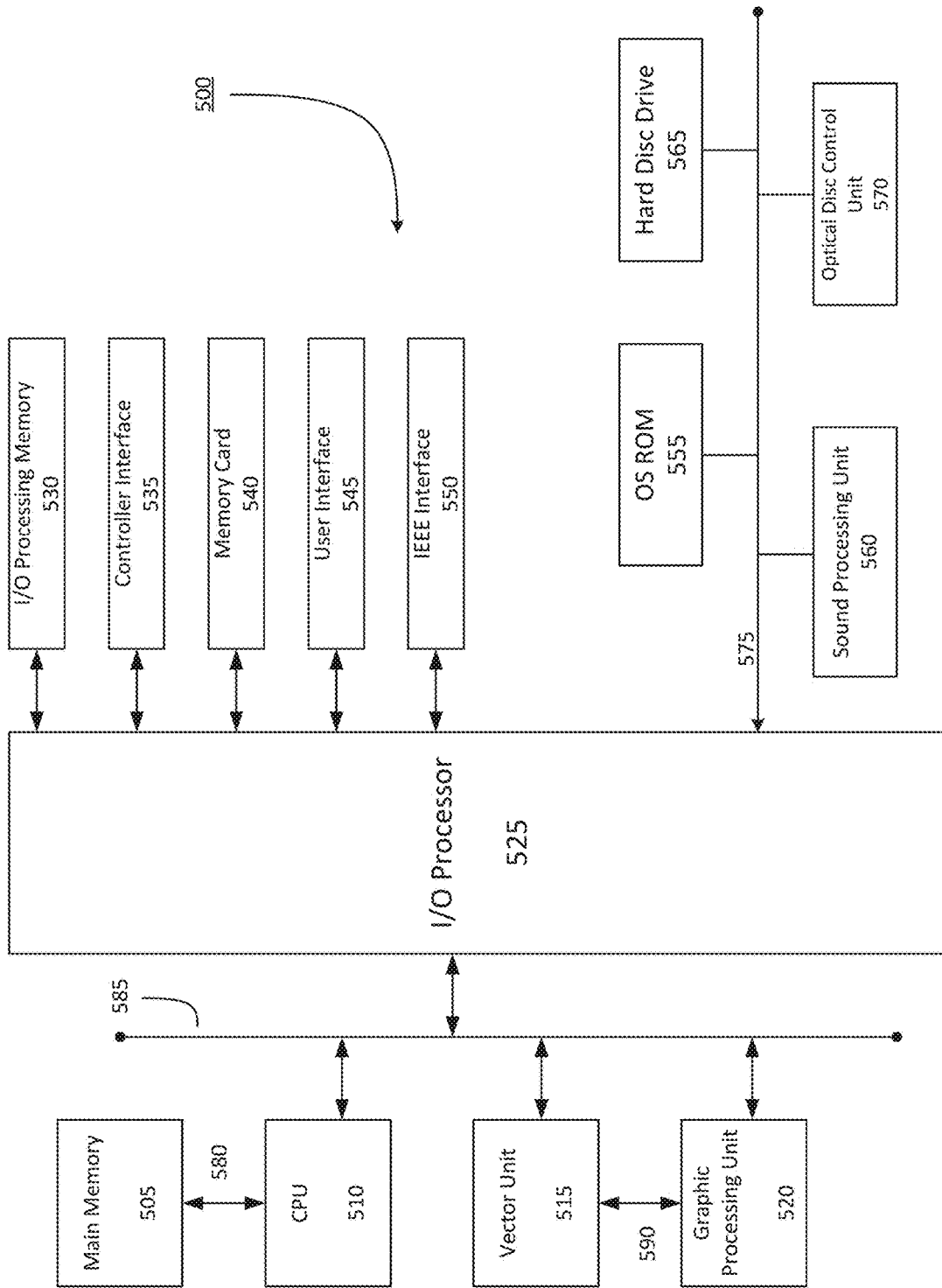
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for visually tagging communications in communication sessions, the method comprising:
    monitoring a current communication session associated with a user device communicating over a communication network with one or more other user devices, wherein the current communication session is associated with a current virtual environment that includes a character controlled by the user device and exhibiting one or more character behaviors within the current virtual environment while a set of messages is communicated from the user device;
    categorizing an emotional state associated with one or more of the messages in the set based on the character behaviors exhibited within the current virtual environment while the set of messages is communicated from the user device;
    detecting that a categorized emotional state of at least one of the messages in the set triggers a tagging rule customized to the user of the user device; and
    modifying one or more versions of a visual presentation of messages within the current communication session based on the customized tagging rule to include one or more visual tags indicative of the categorized emotional state of the at least one message, wherein a version of the visual presentation provided to the user device is different from a version of the visual presentation provided to one or more of the other user devices in the current communication session.

2. The method of claim 1, further comprising storing a user emotion profile in memory for the user, wherein the user emotion profile includes the tagging rule among a plurality of tagging rules.

3. The method of claim 2, wherein each of the tagging rules specifies an emotional state of the user and one or more corresponding visual tags.

4. The method of claim 1, wherein the visual presentation is modified to include the visual tags in real-time as the at least one message is entered at the user device.

5. The method of claim 1, further comprising:
    detecting activity associated with the set of the messages;
    filtering available visual tags based on the categorized emotional states of the set of the messages; and
    generating a menu that displays a set of the filtered visual tags.

6. The method of claim 1, further comprising tracking a plurality of emotional states associated with the user, and generating a display based on the tracked emotional states.

7. The method of claim 6 wherein the display is a timeline that presents the tracked emotional states in accordance with a sequence in which the tracked emotional states were detected during one or more communication sessions.

8. The method of claim 6, further comprising tracking a plurality of emotional states associated with a plurality of other users, wherein the display is a heatmap that visually presents the tracked emotional states associated with the user and the other users across one or more parameters.

9. The method of claim 1, wherein categorizing the emotional state is further based on an emotion-based learning model specific to the user of the user device.

10. The method of claim 1, wherein categorizing the emotional state is further based on one or more in-game errors within the current virtual environment.

11. The method of claim 1, wherein modifying the one or more versions of the visual presentation includes implementing one or more game-based modifications based on the categorized emotional state of the at least one message that triggers the tagging rule.

12. A system for visually tagging communications in communication sessions, the system comprising:
    a communication interface that communicates over a communication network, wherein the communication interface monitors a current communication session associated with a user device communicating with one or more other user devices, and wherein the current communication session includes a visual presentation of a plurality of messages communicated from the user device and the other user devices, wherein the current communication session is associated with a current virtual environment that includes a character controlled by the user device and exhibiting one or more character behaviors within the current virtual environment while a set of messages is communicated from the user device; and
    a processor that executes instructions stored in memory, wherein the processor executes the instructions to:
    categorize an emotional state associated with one or more of the messages in the set based on the character behaviors exhibited within the current virtual environment while the set of messages is communicated from the user device;
    detect that a categorized emotional state of at least one of the messages in the set triggers a tagging rule customized to the user of the user device; and modify one or more versions of the visual presentation of messages within the current communication session based on the customized tagging rule to include one or more visual tags indicative of the categorized emotional state of the at least one message, wherein a version of the visual presentation provided to the user device is different from a version of the visual presentation provided to one or more of the other user devices in the current communication session.

13. The system of claim 12, further comprising memory that stores a user emotion profile for the user, wherein the user emotion profile includes the tagging rule among a plurality of tagging rules.

14. The system of claim 13, wherein each of the tagging rules specifies an emotional state of the user and one or more corresponding visual tags.

15. The system of claim 12, wherein the visual presentation is modified to include the visual tags in real-time as the at least one message is entered at the user device.

16. The system of claim 12, wherein the processor executes further instructions to:
 detect activity associated with the set of the messages;
 filter available visual tags based on the categorized emotional states of the set of the messages; and
 generate a menu that displays a set of the filtered visual tags.

17. The system of claim 12, further comprising memory that tracks a plurality of emotional states associated with the user, and wherein the processor executes further instructions to generate a display based on the tracked emotional states.

18. The system of claim 17, wherein the display is a timeline that presents the tracked emotional states in accordance with a sequence in which the tracked emotional states were detected during one or more communication sessions.

19. The system of claim 17, wherein the memory further tracks a plurality of emotional states associated with a plurality of other users, and wherein the display is a heatmap that visually presents the tracked emotional states associated with the user and the other users across one or more parameters.

20. A non-transitory, computer-readable storage medium, having embodied thereon a program executable by a processor to perform a method for visually tagging communications in communication sessions, the method comprising:
 monitoring a current communication session associated with a user device communicating over a communication network with one or more other user devices, wherein the current communication session is associated with a current virtual environment that includes a character controlled by the user device and exhibiting one or more character behaviors within the current virtual environment while a set of messages is communicated from the user device;
 categorizing an emotional state associated with one or more of the messages in the set based on the character behaviors exhibited within the current virtual environment while the set of messages is communicated from the user device;
 detecting that a categorized emotional state of at least one of the messages in the set triggers a tagging rule customized to the user of the user device; and
 modifying one or more versions of a visual presentation of messages within the current communication session based on the customized tagging rule to include one or more visual tags indicative of the categorized emotional state of the at least one message, wherein a version of the visual presentation provided to the user device is different from a version of the visual presentation provided to one or more of the other user devices in the current communication session.

\* \* \* \* \*